Figure 1:
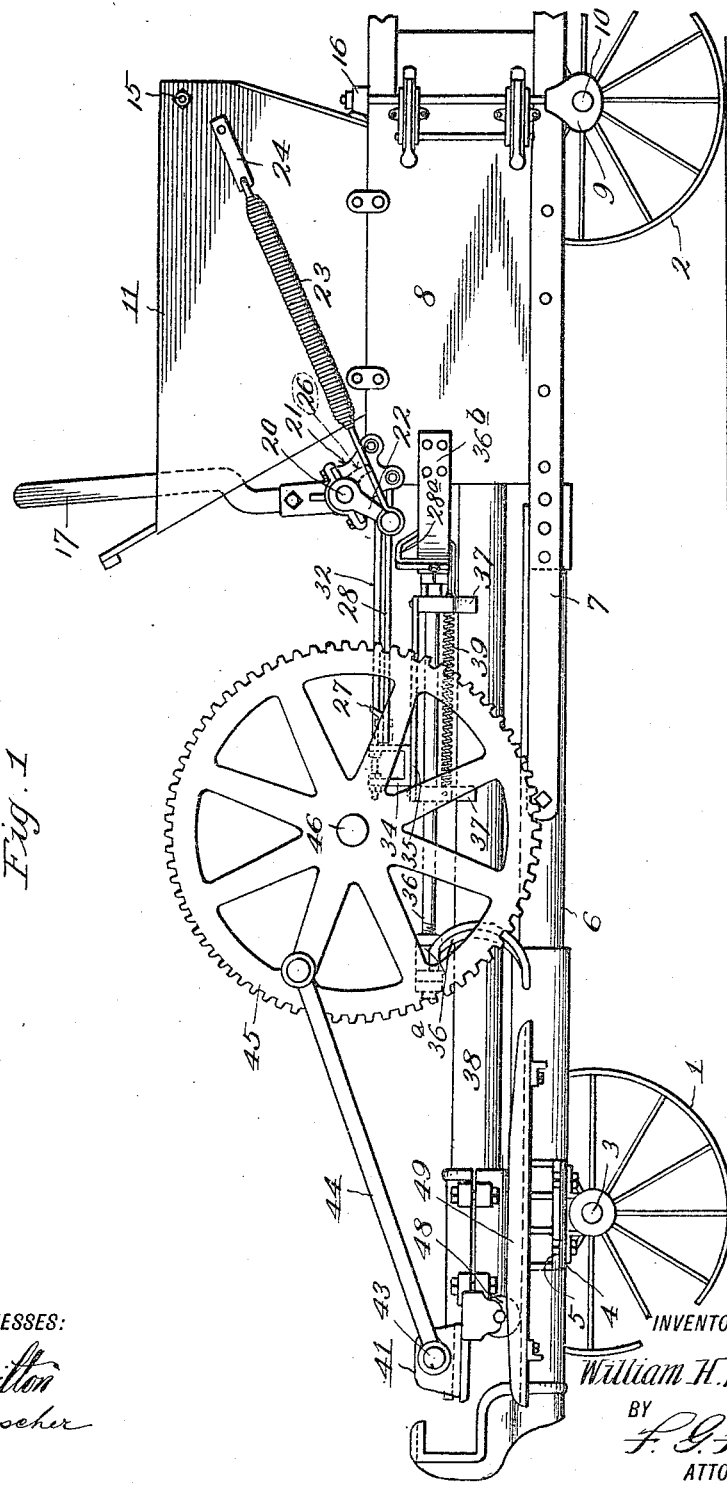

W. H. STEWART.
BALING PRESS.
APPLICATION FILED MAR. 7, 1914.

1,124,354.

Patented Jan. 12, 1915.
3 SHEETS—SHEET 1.

WITNESSES:
R. Hamilton
J. C. Rischer

INVENTOR:
William H. Stewart,
BY
F. G. Fischer,
ATTORNEY.

W. H. STEWART.
BALING PRESS.
APPLICATION FILED MAR. 7, 1914.
1,124,354.
Patented Jan. 12, 1915.
3 SHEETS—SHEET 2.
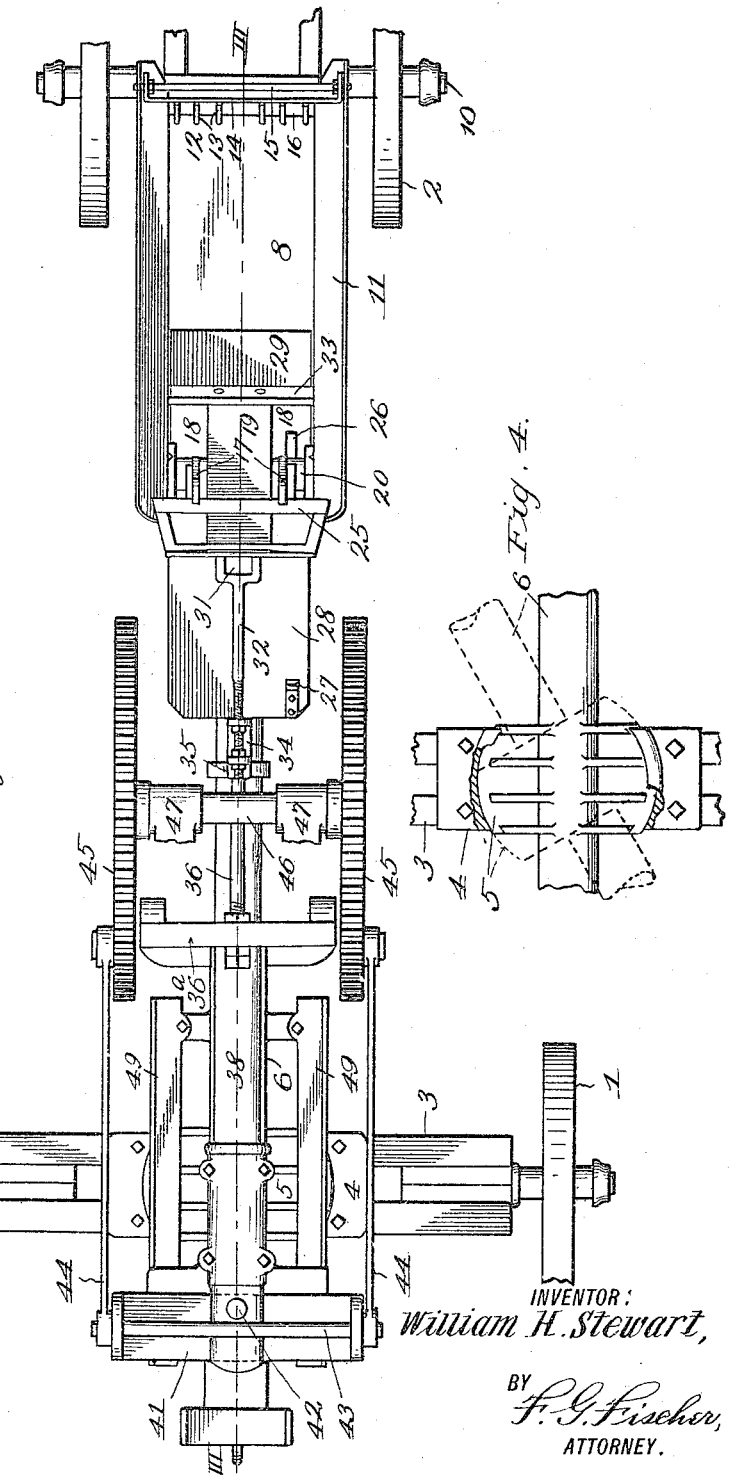

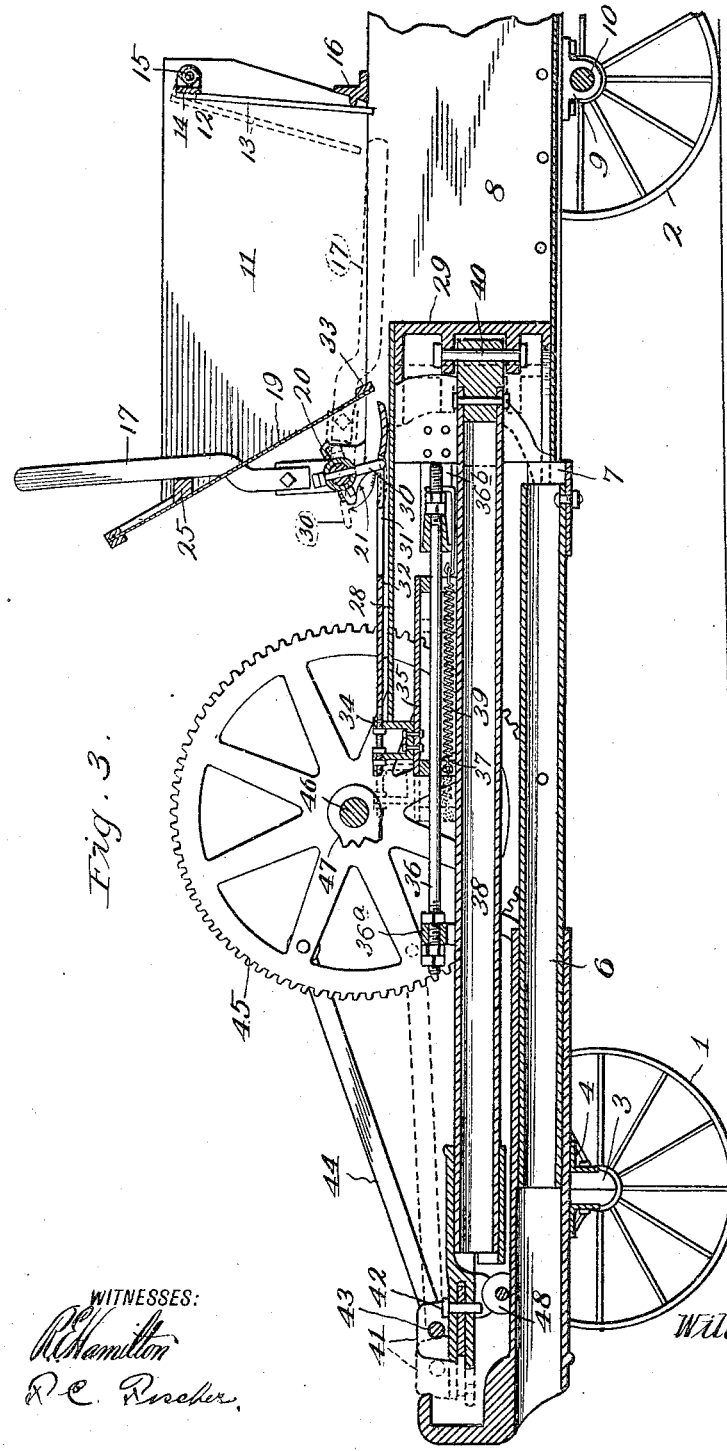

UNITED STATES PATENT OFFICE.

WILLIAM H. STEWART, OF KANSAS CITY, KANSAS, ASSIGNOR, BY MESNE ASSIGNMENTS, TO FRANK WARNER, OF BONNER SPRINGS, KANSAS.

BALING-PRESS.

1,124,354. Specification of Letters Patent. Patented Jan. 12, 1915.

Application filed March 7, 1914. Serial No. 823,109.

*To all whom it may concern:*

Be it known that I, WILLIAM H. STEWART, a citizen of the United States, residing at Kansas City, in the county of Wyandotte and State of Kansas, have invented certain new and useful Improvements in Baling-Presses, of which the following is a specification.

My invention relates to improvements in baling presses, and one object is to provide a machine of this character which is light and simple in construction, and has a maximum capacity at a minimum expenditure of power.

A further object is to provide an automatic feeder, to force the charges of material down into the baling-case in advance of the plunger, and thus avoid the danger attendant on this work when it is manually performed.

Another object is to provide safety means whereby the division blocks for the separation of the bales, can be inserted in the baling-case without danger of the operator being struck by the automatic feeder.

A further object is to provide equalizing means whereby power is transmitted from the press motor to the plunger without cramping the latter in the baling-case due to wear or improper adjustment of the transmission gearing.

Other objects of the invention will hereinafter appear, and in order that said invention may be fully understood, reference will now be made to the accompanying drawings, in which:

Figure 1 is a broken side elevation of a baling press embodying my invention. Fig. 2 is a broken plan view of the baling press. Fig. 3 is a central longitudinal section on line III—III of Fig. 2. Fig. 4 is a broken detail plan view showing a turn-table whereby the front axle of the baling press may turn in rounding a corner. Fig. 5 is a broken detail perspective of certain mechanism employed in controlling the automatic feeder. Fig. 6 is a plan view of a pull-bar employed in controlling the automatic feeder.

In practice, I prefer to employ a motor to operate the plunger and the automatic feeder of the press, and mount said motor on a suitable frame above the front axle, but as any suitable type of motor may be employed, I have deemed it unnecessary to show one in the drawings.

In practice, I mount the baling-press upon a pair of front wheels 1 and a pair of rear wheels 2, so that it may be readily drawn from one place to another.

The front wheels 1 are mounted upon a composite axle 3 having a centrally-disposed turn-table member 4 supporting an upper turn-table member 5, said turntable-members being capable of rotating at an angle to each other, as indicated by the dotted lines, Fig. 4. The upper turn-table member 5 is fixedly secured to a reach 6, secured at its rear end to a pair of straps 7, secured to the baling-case 8, mounted upon bearings 9 supported by the rear axle 10.

11 designates a hopper mounted upon the forward portion of the baling-case 8 to receive the charges of hay or other material to be baled.

The rear open end of the hopper 11 is provided with a guard 12, consisting of a plurality of rods 13 and a transverse bar 14 carrying said rods and pivotally-mounted upon a cross rod 15 secured to the opposite sides of the hopper. The free ends of rods 13 rest against a cross bar 16 connecting the lower rear end of the hopper with the top of the baling-case 8.

The two central rods 13 are spaced farther apart than their companions (Fig. 2) to admit the hand of the operator in placing division boards, whereby the bales are separated, into the baling-case, which is accomplished by pushing the lower ends of the rods 13 forward (see dotted lines Fig. 3) with the lower edge of each division board and then placing the latter vertically in the baling-case. The foregoing operation can be accomplished without danger to the hand of the operator, owing to its location in the wide space between the two central rods 13, while the arms of the feeder 17 are descending to the dotted position disclosed by Fig. 3.

The feeder arms 17 work through slots 18 in the forward inclined end 19 of the hopper 11, and are fixedly-mounted upon a transverse shaft 20 rockably mounted in a pair of brackets 21 secured to the sides of the baling-case 8.

One end of shaft 21 is provided with a fixedly-mounted crank 22, connected at its lower end to a retractile spring 23, secured at its upper rear end to a strap 24, fixed to the adjacent end of the hopper 11. Spring 23 restores the feeder 17 to raised position against a stop 25, and holds said feeder against said stop 25 until it is again drawn down to the dotted position.

The initial part of the upward stroke of the feeder is accomplished by a finger 26, secured to the shaft 20 in the path of a lug 27, secured upon the apron 28 of the plunger-head 29, reciprocably mounted in the baling-case 8. As the feeder 17 moves upward and the crank 22 moves downward below a line drawn through the shaft 20 and the strap 24, the spring 23 contracts and completes the upward movement of the feeder by pulling backward upon said crank 22. A support 28ᵃ is provided for the free end of the apron 28, to prevent the same from vibrating as it moves back and forth.

The initial part of the downward stroke of the feeder 17 is accomplished by a pin 30, depending from shaft 20 into a slot 31 of a pull-bar 32. As the feeder 17 moves downward and the crank 22 moves upward above a line drawn through shaft 20 and the strap 24, the spring 23 contracts and drawing the crank 20 upward and backward completes the downward stroke of the feeder 17, said downward stroke being limited by a stop 33 secured to the lower front end of the hopper and the opposite sides of the baling-case.

The forward end of the pull-bar 32 is adjustably secured to a yoke 34, secured upon a reciprocable member 35, slidably mounted upon a rod 36 and provided at its ends with depending forks 37, which straddle the plunger stem 38 and prevent member 35 from rocking upon the rod 36 and thus interfering with the proper operation of the pull-bar 32 and the pin 30.

Rod 36 is supported at one end by a cross bar 36ᵃ having arms secured to the reach 6, and at its opposite end by a yoke 36ᵇ, secured to the sides of the baling-case 8.

The yoke 34 and parts connected thereto are advanced to the end of their forward stroke, as indicated by the dotted lines Fig. 3, through the intermediacy of the apron 28, and said yoke 34 and the parts connected thereto are returned to the end of their backward stroke, as the apron 28 advances, by a retractile spring 39, secured at its ends to the forward fork 37 and the rear end of the rod 36.

The plunger stem 38 is pivotally-connected at one end to the plunger-head 29 by a bolt 40 and pivotally-connected at its opposite end to an equalizing-bar 41 by a pin 42. The equalizing-bar 41 is provided with a rod 43, connected at its ends to a pair of pitmen 44, actuated by a pair of gear wheels 45, mounted upon a shaft 46, journaled in bearings 47 on the frame of a motor (not shown) and whereby the gear wheels 45 are driven. By interposing the equalizing-bar 41 between the plunger-stem 38 and the pitmen 44, it is obvious that should wear of the parts, or improper adjustment of the wheels 45, move one of said pitmen slightly in advance of the other, such movement will be taken up by said equalizing-bar 41, instead of being transmitted to the plunger and causing the same to bind against one side or the other of the baling-case 8.

In order that the operation of the plunger may be attended with but little friction, I mount one end of its stem 38 upon a pair of rollers 48, arranged to traverse a track comprising two flanged rails 49, mounted upon the upper turn-table 41 and secured to the reach 6.

The operation of the press, briefly stated, is as follows: As the plunger advances on its forward stroke, the charge of material is held down in the baling-case 8 by the feeder 17 in advance of the plunger-head 29, until said plunger-head almost completes the forward end of its stroke, or to be more precise, until the lug 27 on the apron 28 contacts the finger 26 and imparts the initial portion of the upward stroke to said feeder, said upward stroke being completed by the spring 23, as above described. The feeder 17 remains in its upward position, so that other charges of material may be pitched into the hopper 11 throughout practically the entire backward stroke of the plunger, or until the rear end of the pull-bar slot 31 engages the pin 30 and imparts the initial portion of the downward stroke to the feeder 17, which stroke, as hereinbefore described, is completed by the spring 23. As the feeder 17 sweeps down through the hopper 11, it pushes and condenses the material down into the baling-case 8 in advance of the plunger, which again advances as above described.

The speed of the plunger and coacting parts is restricted only by the speed at which charges of material can be placed in the hopper, hence it will be understood that I have produced a baling press of maximum capacity.

Having thus described my invention, what I claim and desire to secure by Letters Patent, is:

1. In a machine of the character described, in combination with a hopper, oscillatory feeder arms to sweep through said hopper, a pull-bar to impart the downward stroke to said feeder arms, means to impart an upward stroke to said feeder arms, and a plunger to control said means and the pull-bar.

2. In a machine of the character described, a hopper, an oscillatory feeder to sweep through said hopper, a pull-bar to impart the initial portion of the downward stroke to said feeder, means to impart the initial portion of the upward stroke to said feeder, a plunger to control said means and the pull-bar, and resilient means to complete the downward and upward strokes of the feeder.

3. In a machine of the character described, a hopper, an oscillatory feeder to sweep through said hopper, a pull-bar to impart the initial portion of the downward stroke to said feeder, reciprocable means carrying said pull-bar, a plunger to move said reciprocable means in one direction, a resilient member to move said reciprocable means in the opposite direction, means to impart the initial portion of the upward stroke of the feeder, said means being controlled by the plunger, and a spring to complete the upward and downward strokes of the feeder.

4. In a machine of the character described, a hopper, an oscillatory feeder arranged to sweep through said hopper, a pin to move said feeder on its downward stroke, a pull-bar to actuate said pin, a reciprocable member carrying said pull-bar, a rod upon which said reciprocable member is slidably-mounted, forks descending from said reciprocable member, a plunger stem straddled by said forks, means to move the feeder on its upward stroke, and a plunger embodying the plunger stem and adapted to control said means and the reciprocable member.

5. In a machine of the character described, a hopper, an oscillatory feeder arranged to sweep through said hopper, a finger to impart upward movement to said feeder, means to impart downward movement to said feeder, and a plunger to control said means and the finger.

6. In a machine of the character described, a hopper, an oscillatory feeder to supply said hopper, a finger to impart upward movement to said feeder, a lug to actuate said finger an apron carrying said lug, a plunger embodying said apron, and means controlled by said plunger to move the feeder downward.

7. In a machine of the character described, a plunger, a baling case in which said plunger is reciprocably mounted an equalizing-bar pivotally-secured to said plunger and means connected to said equalizing-bar to reciprocate the plunger.

8. In combination with a hopper of a baling press, an oscillatory feeder arranged to sweep through said hopper, and a safety appliance mounted near one end of said hopper, so that division boards may be passed through said hopper without danger to the operator.

9. In combination with the hopper of a baling press, an oscillatory feeder arranged to sweep through said hopper, and a safety appliance mounted near one end of said hopper, so that division boards may be passed through said hopper without danger to the operator, said safety appliance consisting of a pivotally-mounted transverse bar, and rods depending from said bar.

In testimony whereof I affix my signature, in the presence of two witnesses.

WILLIAM H. STEWART.

Witnesses:
  F. G. Fischer,
  Fred C. Fischer.